United States Patent [19]

Yasuda et al.

[11] 3,937,678

[45] Feb. 10, 1976

[54] PROCESS FOR MODIFYING RHEOLOGICAL AND SUSPENSION PROPERTIES OF NONAQUEOUS SUSPENSION

[75] Inventors: Zenpachi Yasuda, Kasukabe; Hiroshi Koizumi, Tokyo; Masao Hasunuma, Ohmiya; Satoshi Oda, Koshigaya, all of Japan

[73] Assignee: Kusumoto Chemicals Ltd., Tokyo, Japan

[22] Filed: July 5, 1974

[21] Appl. No.: 485,948

[30] Foreign Application Priority Data

July 16, 1973 Japan.............................. 48-79290

[52] U.S. Cl............ 260/28.5 R; 106/229; 106/270; 106/271; 106/272; 260/18 N; 260/28 R; 260/404.5
[51] Int. Cl.² ......................................... C08L 91/00
[58] Field of Search ........... 106/229, 272, 270, 271; 260/18 N, 28, 28.5 R, 404.5

[56] References Cited
UNITED STATES PATENTS

| | | | |
|---|---|---|---|
| 2,766,214 | 10/1956 | Erchak | 260/28.5 R |
| 2,824,848 | 2/1958 | Wittcoff | 260/28 |
| 3,260,609 | 7/1966 | Reeser | 260/28 |
| 3,362,839 | 1/1968 | Weindel | 106/270 |
| 3,407,160 | 10/1968 | Frank | 260/28 |
| 3,502,602 | 3/1970 | Helm et al. | 260/18 N |
| 3,622,604 | 11/1971 | Drawert et al. | 260/18 N |
| 3,644,245 | 2/1972 | Flanagan et al. | 260/28 |
| 3,787,342 | 1/1974 | Berry et al. | 260/28 |
| 3,819,386 | 6/1974 | Higgins et al. | 260/404.5 |

*Primary Examiner*—M. J. Welsh
*Attorney, Agent, or Firm*—Sherman & Shalloway

[57] ABSTRACT

A process for improving rheological properties and suspension properties of a nonaqueous fluid system containing finely divided solid particles, characterized in that an amide wax (I) having a melting point of about 100° to about 160°C. obtained from reaction of hydrogenated castor oil fatty acid or an organic acid mixture containing at least 30 molar per cent of hydrogenated castor oil fatty acid with amines and an emulsifiable polyethylene wax (II) having an acid number of about 2 to 50, a softening point of about 95° to about 120°C., a density of about 0.92 to about 0.98 and a penetration of about 1 to about 20 are added to the nonaqueous fluid system, and the nonaqueous fluid system obtained by aforesaid process.

10 Claims, No Drawings

PROCESS FOR MODIFYING RHEOLOGICAL AND SUSPENSION PROPERTIES OF NONAQUEOUS SUSPENSION

The present invention relates to a process for the modification rheological properties and suspension properties of a nonaqueous suspension, or a nonaqueous fluid system containing solid particles finely divided.

Among additives hitherto used to modify the rheological properties of a nonaqueous fluid system containing finely divided solid particles (hereinafter called nonaqueous suspension), such as a paint product are included metallic soap, montmorillonite derivatives, polymerized oil, fatty acids, dimer acids, alkyl esters of dimer acids, hydrogenated castor oil, emulsifiable polyethylene wax and so on. They each have their disadvantages as described below.

Metallic soap such as aluminum stearate varies in swelling properties with solvent or temperature and the resultant gel structure is unstable. When polar solvents such as water or alcohol are incorporated, precipitate or seeds particularly tend to occur. Once precipitates or seeds have occurred, they will not easily disappear and tend to cause a decrease in resistance to water, softening of the film, reduction of gloss, and so on, because they are slightly hydrophilic.

Montmorillonite derivatives have scattering results in their effectiveness owing to remarkable bodying-up properties and if swelling and dispersion are insufficient, they reduce viscosity and thixotropy during storage.

Polymerized oil sometimes causes a great decrease in the gloss of dry film or the film's antisag properties become very poor because of its extreme bodying-up properties.

Fatty acids and dimer acids are characterized in that they little influence the viscosity of paint by their addition to the paint, but when they are used together with pigments such as common zinc oxide, basic lead carbonate, chrome yellow and calcium carbonate, the gloss of the dry film is greatly lowered or, in the extreme, seeds occur. Alkyl esters of dimer acids can produce comparatively favorable results owing to low degrees of gloss decrease, but this is offset by extreme decrease of antisag properties.

When hydrogenated castor oil is properly swollen and dispersed in paint, it is effective in antisagging within a given range of temperatures. That is, it is not very effective at normal temperature, and above 50°C., seed occur, occasionally even at 40°C. However, since in a general grinding mill, temperature control can not be sufficiently maintained dispersions prepared in winter are not very effective and dispersions prepared in summer tend to produce seeds.

Many attempts have hitherto been made to improve the aforesaid drawbacks. One attempt was to use amide wax together with hydrogenated castor oil. This was still insufficient because the preventive effect against occurrence of seeds is achieved at most up to 60°C. and an ordinary grinding mill very often reaches temperatures of 70°C. or above. In addition, as a result of this denaturation, in most cases effectiveness under conditions of low temperature dispersion is lowered. Thus the range of appropriate grinding temperatures is narrow and does not exceed at most 20°C. even if a zone of weak effect is included.

Emulsifiable polyethylene wax shows antisag effect to some extent and will not produce seeds, unlike hydrogenated castor oil. However, in view of the fact that recently in the paint industry, it has become essential that wet film does not sag immediately after coating, even when as thick as about 250 microns, the aforesaid antisag effect is not sufficient. Additionally, there is the drawback that when loads are increased to obtain a sufficient antisag effect, there is a great decrease in gloss of the dry film.

Thus, in the prior art, when the rheological properties are to be modified by the action of fine swollen particles present in a fine particle suspensison, the effect varies with the swell of the swollen body and the swell itself is considerably influenced by grinding temperautre, kinds of grinding mills, vehicles, and so on. Further, the range of conditions available for a composition provided by the prior art is narrow. Accordingly, in order that satisfactory results may be obtained, it is essential that the use conditions of the prior art compositions be strictly controlled.

It is the object of the present invention to provide a sufficient and effective modifier for improving the rheological and suspension properties of a nonaqueous fluid system.

It is another object of the present invention to provide a process for improving the rheological and suspension properties of a nonaqueous fluid system containing finely divided solid particles by the addition of such a modifier to the nonaqueous fluid system.

It is still another object of the present invention to provide a nonaqueous fluid system containing finely divided solid particles, having improved rheological and suspension properties due to the presence of such a modifier in the system.

The inventors have found that the combined use of: (1) an amide wax having a melting point of about 100° to 160°C., prepared by reacting hydrogenated castor oil fatty acid or an organic acid mixture containing at least 30 molar percent of hydrogenated castor oil fatty acid with certain amines; and (2) an emulsifiable polyethylene wax having an acid number of about 2 to 50, a softening point of about 95° to about 120°c., a density of about 0.92 to about 0.98 and a penetration of about 1 to about 20; is essential for the attainment of the aforesaid object of the present invention.

According to the present invention, there is provided (A) a process for improving the rheological properties and suspension properties of a nonaqueous fluid system characterized by adding said amide wax (I) and said emulsifiable polyethylene wax (II) into the nonaqueous fluid system containing finely divided solid particles and (B) a nonaqeous fluid system containing finely divided solid particles having improved rheological and suspension properties characterized in that the amide wax (I) and the emulsifiable polyethylene wax (II) are present in the system.

Among amines useful as starting materials of the amide wax (I) in the present invention are alcohol amines such as monoethanolamine, diethanolamine and aminoethyl ethanolamine, polyamines such as ethylenediamine, propylenediamine, hexamethylenediamine, octamethylenediamine, dodecamethylenediamine, diethylenetriamine, triethylenetetramine and xylylenediamine and benzylamine.

It is essential that the amide wax (I) in the present invention have a melting point of about 100° to about 160°C. and an amide wax departing from the melting point range cannot produce the desired effect of the present invention.

It is preferable for the object of the present invention that the emulsifiable polyethylene wax (II) have a molecular weight of about 700 to 6000 and particularly about 1000 to 3500.

In the present invention, improvements in the rheological and suspension properties of the nonaqueous suspension cannot be made until a synergistic effect is produced by the use of both an amide wax (I) and an emulsifiable polyethylene wax (II). The object of the present invention cannot be attained with the single use of either an amide wax (I) or emulsifiable polyethylene wax (II).

For instance, an emulsifiable polyethylene wax (II) used alone produces the problems discussed previously. On the other hand, the use of an amide wax alone cannot produce sufficient antisag effect unless the amide wax is subjected to optimal dispersion and swelling conditions. In order that an amide wax may be placed in the optimal dispersion and swelling state, it is necessary to disperse it in comparatively limited kinds of nonaqueous suspension under restricted conditions. For instance, when dispersion is conducted with a grinding mill such as a roller mill, to which it is difficult to apply high temperatures, no effect is obtained because of lack of swelling.

Unlike the use of an amide wax (I) or emulsifiable polyethylene wax (II) alone, the combined use of both in the present invention can remarkably improve the rheological and suspension properties of a nonaqueos suspension by adding both under no strict limitation of use conditions to obtain a nonaqueous fluid system having excellent time stability.

Without restriction as to theory, it is believed that the effect produced by the combination of an amide wax (I) and an emulsifiable polyethylene wax (II) in the present invention relies on the development of a thixotropical gel structure in the nonaqueous suspension. Such gel structure can be considered as consisting of a structure of mutual emulsifiable polyethylene wax particles adherent to solid particles, a structure between amide wax particles, and solid particles and a structure between emulsifiable polyethylene wax particles adherent to the solid particles and amide wax particles. Particularly, a structure between emulsifiable polyethylene wax particles and amide wax particles is thought to greatly affect the formation of thixotropic gel structure. If according to this principle, grinding at high temperatures is carried out as a step of adding an emulsifiable polyethylene wax to the nonaqueous suspension of the present invention, emulsifiable polyethylene wax particles are fully adsorbed by solid particles present in the nonaqueous suspension, bring about better results.

In the present invention an amide wax (I) and an emulsifiable polyethylene wax (II) may be added to a nonaqueous suspension either separately or in the form of a mixture or eutectic of both waxes. They may take a powdery form or dispersion form in a nonaqueous medium when they are added to the nonaqueous suspenion. Adding to the nonaqueous suspension a dispersion containing both ingredients in a nonaqueous medium is best from a practical standpoint since there is no need to select a grinding mill and grinding temperature.

One preferable embodiment of the present invention will be described below.

An amide wax (I) and an emulsifiable polyethylene wax (II) are mixed and dispersed in a paint or other nonaqueous suspension containing pigment or other solid particles with the use of common apparatus (sand grinding mill, roller mill, ball mill, dissolver, etc.) in a wide range of temperatures from room temperature to high temperatures of 70°C. or above. The ratio by weight of the amide wax (I) to the emulsifiable wax (II) use ranges from 10:90 to 85:15. The loads of both in the nonaqueous suspension vary with various factors such as the desired effect (antisag properties, pigment antisettling properties, etc.), properties of the suspension, dispersion conditions in preparing the suspension and types of nonaqueous fluids to be used and thus are not limitative. However, the loads in solid content are usually 0.1 to 5% by weight.

The present invention will be described by way of examples. Parts and percentages are by weight unless otherwise stated and loads in each example are in solid content.

EXAMPLE 1

To tall oil soya alkyd resin paint having a composition as shown in Table 1 are added well-known, conventional modifiers and those of the present invention, respectively. Consistency at 25°C. with a Stormer viscometer, antisag properties, pigment antisettling properties, accelerated can stability in a thermostatic chamber at 50°C. for 30 days and gloss of dry film (values of a glossmeter in Japanese Industrial Standards-K-5400,64) are measured respectively and the test results are given in Table 2.

Modifier in example 1-1

Fluid dispersion prepared by mixing together (A) one part N,N'-12-hydroxy stearoylhexamethylene diamide (mp 132°C) obtained from both one mole of hexamethylenediamine and two moles of hydrogenated castor oil fatty acid and (B) 2 parts of an emulsifiable polyethylene wax having an average molecular weight 2800, an acid number 17, a softening point 97°C., a density of 0.920 and a penetration of 18 in 7 parts xylol.

Modifier in example 1-2

(A) Fluid dispersion prepared by mixing one part of amide wax in four parts xylol . . . One part
(B) Fluid dispersion prepared by mixing one part of the emulsifiable polyethylene wax in four parts of xylol . . . Two parts

Modifier in example 1-3

(A) Amide wax pulverized to 30 microns . . One part
(B) Fluid dispersion prepared by mixing one part of the emulsifiable polyethylene wax in four parts of xylol . . . Ten parts

Modifier in example 1-4

A mixture of (A) one part of the emulsifiable polyethylene wax pulverized to 90 microns and (B) one part of the amide wax pulverized to 90 microns.

Table 1

| (Ingredients) | Oil-modified Alkyd Resin Paint (Amount) |
|---|---|
| Rutile, titanium dioxide | 18 parts |
| Anatase, titanium dioxide | 7 |
| Zinc oxide | 5 |
| Calcium carbonate | 10 |

Table 1-continued

| (Ingredients) Oil-modified Alkyd Resin Paint | (Amount) |
|---|---|
| Tall-oil soya alkyd solution (70% nonvolatile, 65% oil length) | 50.5 |
| Mineral spirits | 8.2 |
| Cobalt naphthenate (5% Co) | 0.2 |
| Lead naphthenate (15% Pb) | 1.0 |
| Antiskinning agent | 0.1 |

Table 2

| Modifier | Loads (%) | Consistency (KU) | Antisag properties (mils) | Pigment antisettling properties | Accelerated can stability | Gloss of film |
|---|---|---|---|---|---|---|
| None | — | 80 | 6 | poorest | Poorest | 88 |
| Aluminum stearate | 0.4 | 108 | 10 | Poor | Poor | 83 |
| Montmorillonite derivatives | 0.4 | 116 | 11 | Poor | Poor | 83 |
| Hydrogenated castor oil | 0.4 | 120 | 12 | Good | Good, seeding | 83 |
| Emulsifiable polyethylene wax | 0.4 | 103 | 9 | Best | Little or no clear separation and best | 83 |
| Polymerized linseed oil | 0.4 | 88 | 10 | Poor | Poor | 81 |
| Dimer acid | 0.4 | 81 | 10 | Good | Seeding and good, some clear separation | 75 |
| Butyl ester of dimer acid | 0.4 | 81 | 8 | Poor | Poor and some clear separation | 86 |
| Fluid dispersion prepared by dispersing 2 parts N,N'-12-hydroxy-stearoyl-hexa-methylenediamide obtained from one mole of hexamethyl-enediamine and 2 moles of hydrogenated castor oil fatty acid in 8 parts xylol. | 0.4 | 95 | 13 | Best | Little or no separation, and best | 85 |
| Example 1-1 | 0.4 | 105 | More than 13 | Best | Little or no separation, and best | 83 |
| Example 1-2 | 0.4 | 104 | More than 13 | Best | Little or no separation, and best | 83 |
| Example 1-3 | 0.4 | 98 | More than 13 | Best | Little or no separation, and best | 84 |
| Example 1-4 | 0.4 | 105 | More than 13 | Best | Little or no separation, and best | 85 |

In this test, a metallic testing apparatus, (sag tester) capable of making 11 paths in total, each having a width of 0.25 inch and a clearance from 3 mils (0.003 inch) to 13 mils in an increment of one mil stepwise in depth arranged at equal intervals of 0.2 inch, is used to place on a smooth glass plate wet film bands gradually getting thicker from 3 mils to 13 mils in conformity with the clearance of the paths. Immediately after these bands are placed, the glass plate is vertically hung with the wet film 3 mils thick located uppermost, and preferably in a temperature (20°C. ±1°) and humidity (RH 55%) controlled chamber for 24 hours or until the film has dried, such that the directions of placement of the bands are horizontal. The state of the dry film is observed and the thickness of the film while still wet in the band having a sag exceeding 0.2 inch is judged to determine antisag properties. The paint used for testing antisag is prepared by adding thinner in an appropriate amount to paint made according to the previous formula to give a consistency of 70 KU (25°C.).

Antisag properties are preferably determined in as constant painting operations as possible and consideration is given to the of cause and effect that generally, the higher the consistency of paint, the poorer are the paintings operations, but the antisag properties become better. Antisag properties listed in the Table are estimated by the aforesaid method of testing and the greater the numerical values, the better the antisag properties. Further, "more than 13 mils" means that there are no sag portions of 0.2 inch in wet film 13 mils thick. That is, film which sags more that 0.2 inch exceeds 13 mils in thickness.

Film exceeding 13 mils cannot be measured with this tester.

In the test of pigment antisettling properties, the paint used for antisag testing, and having a consistency of 70 KU (25°C.), is hermetically sealed and allowed to stand for 30 days in a chamber at 25°C. Then the seal is broken and a stirring rod is gently inserted into the container to estimate the settling degree of the pigment which will collect at the bottom of the container. The paint which maintains almost the initial dispersion state and which has no settling is estimated best, disregarding the presence of a slightly dilute portion of the pigment at the top. The paint which has settling is rated good or poor according to the degree of difficulty of redispersion properties found by comparatively simple agitation and the paint settling compactly and difficult to redisperse is rated poorest.

For the can stability test, the paint used for the antisag test is adjusted to 70 KU (25°C.), hermetically sealed, stored for 30 days in a temperature controlled chamber at 50°C. to carry out an accelerated test, and then, the seal is broken to observe the degree of clear separation of the uppermost layer. Setting is estimated by the aforesaid antisettling procedure. Film is then prepared by the procedure of making a board for measuring film gloss and the presence of seeds is checked as well.

As given in Table 2, conventional modifiers, when compared with the modifiers of the present invention, show that even when antisag properties are made slightly poorer by adjusting loads, the gloss of the dry film is lowered or the films antisag properties tremendously deteriorate, in a butyl ester of dimer acid having comparatively no reducing of gloss. There are also the disadvantages that in accelerated can stability, seeds occur and clear separation is high. Hence it is obvious that the modifying process of the rheological and suspension properties in the present invention is very useful.

EXAMPLE 2

The modifier of the present invention was added to tall-oil soya alkyd resin paint having a composition as given in Table 3, at grinding temperatures of 30°C., 50°C., and 70°C. for 30 minutes at 1750 r.p.m. with the use of a test sand grinding mill sold by Igarashi Machinery Mfg. Co., Type OSG-21, which grinding mill was hereafter used. The same test as example 1 was made.

Modifier in example 2-1

Fluid dispersion prepared by adding to 7 parts of xylol: one part of N,N'-12-hydroxystearoylethylenediamide (mp 138°C.) obtained from one mole of ethylene diamine and two moles of hydrogenated castor oil fatty acid; and two parts of an emulsifiable polyethylene wax having an average molecular weight of 2800, an acid number of 17, a softening point of 97°C., a density of 0.920 and a penetration of 18.

Modifier in example 2-2

Fluid dispersion prepared by mixing one part of the amide wax in 4 parts of xylol . . . 1 part Fluid dispersion prepared by mixing one part of the emulsifiable polyethylene wax in 4 parts of xylol . . 2 parts Modifier in example 2-3

A mixture of one part of the amide wax pulverized to 80 microns and one part of the emulsifiable polyethylene wax pulverized to 80 microns.

The test results are given in Table 4. For comparison, data for hydrogenated castor oil, the amide wax and the emulsifiable polyethylene wax each used alone are also given in Table 4. Further, test results for antisag of paint adjusted to a consistency of 70 KU (25°C.), with the second addition of thinner in appropriate amounts to the paint tested for accelerated can stability at 50°C. for 30 days, are also given to observe stability of antisag after storage.

Table 3

| Alkyd Resin Paint | |
|---|---|
| (Ingredients) | (Amounts) |
| Rutile, titanium dioxide | 34 parts |
| Anatase, titanium dioxide | 8.4 |
| Tall-oil soya alkyd resin solution (70% nonvolatile, 65% oil length) | 50 |
| Mineral spirits | 6.3 |
| Cobalt naphthenate (5% Co) | 0.2 |
| Lead naphthenate (15% Pb) | 1.0 |
| Antiskinning agent | 0.1 |

Table 4

| Modifier | Loads (%) | Dispersion temperature (°C.) | Antisag properties (mils) | Antisage properties after 30 days storage at 50°C. (mils) | Pigment antisettling properties | Accelerated can stability |
|---|---|---|---|---|---|---|
| None | — | 50 | 5 | 5 | Poorest | poorest |
| hydrogenated castor oil | 0.6 | 30 | 7 | | | |
| | | 50 | Gelled and not worthy of measurement | Gelled and not worthy of measurement | Good | Good and seeding |
| | | 70 | | | | |
| Amide wax | 0.6 | 30 | 7 | 6 | Poor | Good |
| | | 50 | 10 | 9 | Good | Bodied up, and best |
| | | 70 | 12 | 11 | Best | Bodied up, and best |
| Emulsifiable polyethylene wax | 0.6 | 30 | 6 | 5 | Poorest | Poorest |
| | | 50 | 8 | 6 | " | " |
| | | 70 | 8 | 6 | " | " |
| Example 2-1 | 0.6 | 30 | More than 13 | More than 13 | Best | Little or no separation, and best |
| | | 50 | " | " | " | " |
| | | 70 | " | " | " | " |
| Example 2-2 | 0.6 | 30 | " | " | " | " |
| | | 50 | " | " | " | " |
| | | 70 | " | " | " | " |
| Example 2-3 | 1.0 | 30 | 13 | 12 | " | " |
| | | 50 | More than 13 | 13 | " | " |
| | | 70 | " | More than 13 | " | " |

EXAMPLE 3

To tall-oil soya alkyd paint having a composition in Table 3 is added 0.4% of the following modifiers of the present invention with a three roller mill and the procedure in example 1 is carried out. The test results are given in Table 5.

Modifier in Example 3-1

Powdery amide wax (m.p. 112°C.) obtained from 1 mole of diethylenetriamine and 2 moles of hydrogenated castor oil fatty acid and pulverized to 30 microns . . . One part Fluid dispersion prepared by mixing one part of an emulsifiable polyethylene wax having an average molecular weight of 2300, an acid number of 4, a softening point of 118°C., a density of 0.960 and a penetration of 4.4 in 4 parts of xylol . . . One part

Modifier in example 3-2

Fluid dispersion prepared by mixing one part of N,N'-12-hydroxystearoylaminoethylethanoldiamide (m.p. 115°C.) obtained from one mole of aminoethylethanolamine and 2 moles of hydrogenated castor oil fatty acid in 4 parts of xylol . . . 85 parts Fluid dispersion prepared by mixing one part of the emulsifiable polyethylene wax in 4 parts of xylol . . . 15 parts Table 5

| Modifier | Loads (%) | Antisag properties | Antisag properties after 30 days' storage at 50°C. | Pigment antisettling properties | Accelerated can stability | Gloss of film |
|---|---|---|---|---|---|---|
| None | — | 5 mils | 5 mils | Poorest | Poorest | 90 |
| Example 3-1 | 0.4 | More than 13 mils | More than 13 mils | Best | Little or no clear separation, and best | 89 |
| Example 3-2 | 0.4 | " | " | " | " | 89 |

EXAMPLE 4

A fluid dispersion was prepared by mixing 2 parts of an emulsifiable polyethylene wax having an average molecular weight of 1,900, an acid number of 30, a softening point of 108°C., a density of 0.975 and a penetration of 2; and one part of 12-hydroxystearoylethanolamide (m.p. 101°C.) obtained from one mole of monoethanolamine and one mole of hydrogenated castor oil fatty acid in 7 parts xylol added in amounts of 0.4 and 0.6%, respectively to a medium-oil linseed alkyd paint having a composition as given in Table 6, with a test and grinding mill at a grinding temperature of 50°C., at 1750 r.p.m. for a grinding time of 30 minutes.

The same procedure as before is carried out and the test results are given in Table 7.

Table 6

| (Ingredients) | (Amounts) |
|---|---|
| Rutile, titanium dioxide | 19 parts |
| Anatase, titanium dioxide | 6 |
| Calcium carbonate | 9 |
| Medium oil linseed alkyd solution (50% nonvolatile, 52% oil length) | 55 |
| Mineral spirits | 9.7 |
| Cobalt naphthenate (5% Co) | 0.2 |
| Lead naphthenate (15% Pb) | 1.0 |
| Antiskinning agent | 0.1 |

Table 7

| Modifier | Loads (%) | Antisag properties | Antisag properties after 30 days' storage at 50°C. | Pigment antisettling properties | Accelerated can stability | Gloss of film |
|---|---|---|---|---|---|---|
| None | — | 7 mils | 7 mils | Poorest | Poorest | 80 |
| Example 4 | 0.4 | 12 mils | 11 mils | Best | Little or no clear separation, and best | 77 |
| " | 0.6 | more than 13 mils | 13 mils | Best | " | 75 |

EXAMPLE 5

To the petroleum resin-compounding alkyd resin paint (blue) having a composition as given in Table 8 were added respectively 0.5% of the following modifiers of the present invention with a test sand grinding mill, at a grinding temperature of 70°C., at 1750 r.p.m. and for a grinding time of 30 minutes. The procedure was the same as before and the test results are given in Table 9.

Modifier in example 5-1

A fluid dispersion was prepared by mixing one part of an emulsifiable polyethylene wax having an average molecular weight of 3000, an acid value of 13, a softening point of 114°C., a density of 0.963 and a penetration of 2.3; and one part of amide wax (m.p. 160°C.) obtained from two moles of xylylenediamine, one mole of sebacic acid, one mole of ricinoleic acid and one mole of hydrogenated castor oil fatty acid in 8 parts of xylol.

Modifier in example 5-2

Fluid dispersion prepared by mixing one part of amide wax in 4 parts of xylol . . . One part Fluid dispersion prepared by mixing one part of an emulsifiable polyethylene wax having an average molecular weight of 3400, an acid number of 16, a softening point of 100°C., a density of 0.925 and a penetration of 7 in 4 parts of xylol . . . 9 parts Table 8

| Alkyd Resin Paint | |
|---|---|
| (Ingredients) | (Amounts) |
| Rutile, titanium dioxide | 18 parts |

Table 8-continued

| Alkyd Resin Paint | |
|---|---|
| (Ingredients) | (Amounts) |
| Anatase, titanium dioxide | 10 |
| Cyanin blue | 0.5 |
| Calcium carbonate | 12 |
| Tall-oil soya alkyd solution (70% nonvolatile, 65% oil length) | 35 |
| Petroleum resin solution (70% nonvolatile) | 15 |
| Mineral spirits | 8.6 |
| Cobalt naphthenate (5% Co) | 0.2 |
| Lead naphthenate (15% Pb) | 1.0 |
| Antiskinning agent | 0.1 |

Table 9

| Modifier | Loads (%) | Antisag properties | Antisag properties after 30 days' storage at 50°C. | Pigment antisettling properties | Accelerated can stability | Gloss of film |
|---|---|---|---|---|---|---|
| None | — | 4 mils | 4 mils | Poorest | Poorest | 93 |
| Example 5-1 | 0.5 | 12 mils | 12 mils | Best | Little or no clear separation, and best | 91 |
| Example 5-2 | 0.5 | 13 mils | 13 mils | Best | Little or no clear separation, and best | 91 |

EXAMPLE 6

A fluid dispersion was prepared by mixing one part of an emulsifiable polyethylene wax having an average molecular weight of 1700, an acid number of 43, a softening point of 106°C., a density of 0.980 and a penetration of 3; and 2 parts of an amide wax (m.p. 117°C.) obtained from 3 moles of ethylenediamine, 2 moles of hydrogenated castor oil fatty acid, one mole of castor oil fatty acid and one mole of trimellitic acid in 7 parts of xylol and was respectively added in amounts of 0.3 and 0.5% to an epoxy ester resin solution having a composition as given in Table 10, with a test sand grinding mill, at a grinding temperature of 50°C. at 1750 r.p.m. and for a grinding time of 30 minutes. Then the same procedure as before was carried out and the test results are given in Table 11.

Table 10

| Epoxy Ester Resin Paint | |
|---|---|
| (Ingredients) | (Amounts) |
| Epoxy ester resin (Beckosol p-786 sold by Dainippon Ink & Chemicals, Inc.) | 61 parts |
| Rutile, titanium dioxide | 25 |
| Anatase, titanium dioxide | 7 |
| Toluidine red | 0.5 |
| Xylol | 5.4 |
| Cobalt naphthenate (5% Co) | 0.2 |
| Lead naphthenate (15% Pb) | 0.8 |
| Antiskinning agent | 0.1 |

Table 11

| Modifier | Loads (%) | Antisag properties | Antisag properties after 30 days' storage at 50°C. | Pigment antisettling properties | Accelerated can stability | Gloss of film |
|---|---|---|---|---|---|---|
| None | — | 8 mils | 8 mils | Poor | Poorest | 91 |
| Example 6 | 0.3 | More than 13 mils | More than 13 mils | Best | Little or no clear separation, and best | 90 |
| " | 0.5 | " | " | " | " | 88 |

EXAMPLE 7

A powder prepared by feeding into a mixer and pulverizing to 50 microns: one part of an emulsifiable polyethylene wax having an average molecular weight of 2,200, an acid number of 18, a softening point of 107°C., a density of 0.940 and a penetration of 4.5; and one part of N,N'-12-hydroxystearoylxylylenediamide (m.p. 134°C.) obtained from one mole of xylylenediamine and two moles of hydrogenated castor oil fatty acid; and was added in amounts of 0.4 and 0.6% respectively to a solvent type epoxy resin paint (grey) having a composition as given in Table 12, Compound A, with a test sand grinding mill at a grinding temperature of 50°C., at 1750 r.p.m., for a grinding time of 30 minutes. The same procedure as before was taken and the test results are given in Table 13. For the antisag test, however a curing agent solution having the composition of Compound B in Table 12 was added.

Table 12

| Epoxy Resin Paint | |
|---|---|
| (Ingredients) | (Amounts) |
| Compound A | |
| Epoxy resin (Epikote No. 1001 sold by Shell Petrochemical Co.) | 35 parts |
| Rutile, titanium dioxide | 38 |
| Carbon black | 2 |
| Xylol | 15.8 |
| MIBK | 5.4 |
| Cyclohexanone | 2.3 |
| n-butanol | 1.5 |
| Compound B | |
| Polyamide type curing agent (Versamide 115 sold by Daiichi Kogyo Pharmaceutical Co.) | 21 parts |
| Xylol | 14 |
| MIBK | 5 |

Table 12-continued

| (Ingredients) | Epoxy Resin Paint | (Amounts) |
|---|---|---|
| n-butanol | | 2 |

Table 13

| Modifier | Loads (%) | Antisag properties | Antisag properties after 30 days' storage at 50°C. | Pigment antisettling properties | Accelerated can stability | Gloss of film |
|---|---|---|---|---|---|---|
| None | — | 9 mils | 9 mils | Good | good | 86 |
| Example 7 | 0.4 | More than 13 mils | More than 13 mils | Best | Best | 84 |
| " | 0.6 | " | " | " | " | 83 |

EXAMPLE 8

A fluid dispersion was prepared by mixing one part of an emulsifiable polyethylene wax having an average molecular weight of 3000, an acid number of 16, a softening point of 98°C., a density of 0.930 and a penetration of 17; and two parts of an amide wax (m.p. 132°C.) obtained from two moles of ethylenediamine, two moles of hydrogenated castor oil fatty acid and one mole of phthalic anhydride in 7 parts of xylol in amounts of added 0.4 and 0.6% respectively to a nonsolvent type epoxy resin paint (grey) having a composition as given in Table 14, Compound A, with a test sand grinding mill at a grinding temperature of 50°C. at 175 r.p.m. and for a grinding time of 30 minutes.

The same procedure as before was carried out except that for an antisag test, a curing agent solution having the composition of Table 14, Compound B was added. The test results are given in Table 15.

Table 14

| (Ingredients) | Epoxy Resin Paint | (Amounts) |
|---|---|---|
| Compound A | | |
| Epoxy resin (Epikote No. 815 sold by Shell Petrochemical Co.) | | 58.5 parts |
| Rutile, titanium dioxide | | 9.2 |
| Carbon black | | 2.0 |
| Baryte | | 21.4 |
| China clay | | 5.5 |
| 5% phenol solution | | 3.4 |

Table 14-continued

| (Ingredients) | Epoxy Resin Paint | (Amounts) |
|---|---|---|
| Compound B | | |
| Curing agent (Epicure H-3 sold by Shell Petrochemical Co.) | | 23 parts |
| Xylol | | 15 |
| MIBK | | 4 |
| Ethylene glycol monoethyl ether acetate | | 4 |

Table 15

| Modifier | Loads (%) | Antisag properties | Antisag properties after 30 days' storage at 50°C. | Pigment antisettling properties | Accelerated can stability | Gloss of film |
|---|---|---|---|---|---|---|
| None | — | 7 mils | 7 mils | Poor | Poor | 87 |
| Example 8 | 0.4 | More than 13 mils | More than 13 mils | Best | Best | 85 |
| " | 0.6 | " | " | " | " | 83 |

EXAMPLE 9

The modifier of example 1–1 was added in an amount of 0.4% to zinc rich paint having a composition as given in Table 16, with a test sand grinding mill, at a grinding temperature of 50°C., at 1750 r.p.m., and for a grinding time of 30 minutes. The same testing procedure as before was then taken. The test results are given in Table 17. In this test, a consistency of 70 KU was not used but rather Ford Cup 4, in the custom of the industry, and adjusted with xylol so as to get 60 ± 5 seconds (20°C.).

Table 16

| (Ingredients) | Epoxy ester resin Paint | (Amounts) |
|---|---|---|
| Epoxy ester resin (Epikosol 801-X sold by Japan Coating K.K.) | | 20 parts |
| Zinc powder | | 75 |
| Xylol | | 4.3 |
| Cobalt naphthenate (5% Co) | | 0.2 |
| Lead naphthenate (15% Pb) | | 0.3 |
| Antiskinning agent | | 0.2 |

Table 17

| Modifier | Loads (%) | Antisag properties | Antisag properties after 30 days' storage at 50°C. | Pigment antisettling properties | Accelerated can stability |
|---|---|---|---|---|---|
| None | — | 7 mils | 7 mils | Poorest | Poorest |
| DISPARON No. 4200-20 (20% paste of emulsifiable polyethylene wax of Kusumoto Chemicals, Ltd.) | 0.4 | 9 mils | 8 mils | Poor | Poor |
| Example 9 | 0.4 | More than 13 mils | More than 13 mils | Little or no clear | Little or no clear |

Table 17-continued

| Modifier | Loads (%) | Antisag properties | Antisag properties after 30 days' storage at 50°C. | Pigment antisettling properties | Accelerated can stability |
|---|---|---|---|---|---|
| | | | | separation, and best | separation, and best |

EXAMPLE 10

A fluid dispersion was prepared by mixing two parts of an emulsifiable polyethylene wax having an average molecular weight of 1800, an acid number of 16, a softening point of 104°C., a density of 0.939, and a penetration of 4, and one part of N,N'-12-hydroxystearoyldodecamethylenediamide (m.p. 127°C.) obtained from one mole of dodecamethylenediamine and 2 moles of hydrogenated castor oil fatty acid in 7 parts of xylol; and was then added in an amount of 0.3% to a wash primer having a composition as given in Table 18 after which grinding operations were carried out with a test porcelain pot mill for 48 hours. The same testing procedure as before was taken except that consistency was adjusted to 57 KU, instead of 70 KU to be compatible with the type of paint. The test results are given in Table 19.

Table 18

| Wash Primer | |
|---|---|
| (Ingredients) | (Amounts) |
| Polyvinyl butyral resin (S-lec B BL-1 sold by Sekisui Chemical Co.) | 14 parts |
| Zinc chromate (ZTO) | 14 |
| Talc | 2 |
| Ethyl alcohol | 38 |
| Isopropyl alcohol | 16 |
| n-Butyl alcohol | 10 |
| Xylol | 6 |

Table 19

| Modifier | Loads (%) | Antisag properties | Antisag properties after 30 days' storage at 50°C. | Pigment antisettling properties | Accelerated can stability |
|---|---|---|---|---|---|
| None | — | 9 mils | 9 mils | Poorest | Poorest |
| DISPARON No. 4200-20 | 0.4 | 13 mils | 13 mils | Good | Poor |
| Example 10 | 0.3 | More than 13 mils | More than 13 mils | Best | Best |

EXAMPLE 11

A fluid dispersion was prepared by mixing two parts of an emulsifiable polyethylene wax having an average molecular weight of 2400, an acid number of 16, a softening point of 112°C., a density of 0.944 and a penetration of 6.5; and one part of N,N'-12-hydroxystearoylhexamethylenediamide (m.p. 132°C.) obtained from one mole of hexamethylenediamine and two moles of hydrogenated castor oil fatty acid in 7 parts of styrene monomer; and was then added in an amount of 0.8% to an unsaturated polyester resin paint having a composition as given in Table 20, using a three roller mill. The same test procedure as before was taken and the test results are given in Table 21. However, in the test, consistency was adjusted to 100 KU to be compatible with the paint and an accelerated can stability test was carried out at 40°C.

Table 20

| Unsaturated Polyester Resin Paint | |
|---|---|
| (Ingredients) | (Amounts) |
| Unsaturated polyester resin (Polylite No. 8010 sold by Dainippon Ink & Chemicals, Inc.) | 84 parts |
| Rutile, titanium dioxide | 16 |

Table 21

| Modifier | Loads (%) | Antisag properties | Antisag properties after 30 days' storage at 40°C. | Pigment antisettling properties | Accelerated can stability | Gloss of film |
|---|---|---|---|---|---|---|
| None | — | 8 mils | 8 mils | Good | Poor | 92 |
| Example 11 | 0.8 | 13 mils | 13 mils | Best | Little or no clear separation, and best | 92 |

EXAMPLE 12

The modifier of example 1-4 was added to an oil caulking compound having a composition as given in Table 22 in an amount of 0.4% with a three roller mill. Loading effect of the modifier was tested according to the slump testing method on a construction oil-caulking compound (Japanese Industrial Standards A 5751-44). The test results are given in Table 23. Temperature conditions for the slump test is 20° ± 3°C. for the initial 24 hours and 60° ± 3°C. for another 24 hours.

Table 22

| Oil Caulking Compound | |
|---|---|
| (Ingredients) | (Amounts) |
| Polybutene (molecular weight of 1200) | 12 parts |
| Soya alkyd solution | 21 |
| Polymerized linseed oil | 6 |
| Calcium carbonate | 38 |
| Talc | 15 |

Table 22-continued

| (Ingredients) | Oil Caulking Compound (Amounts) |
|---|---|
| Asbestos | 3 |
| Anatase (titanium dioxide) | 4.8 |
| Cobalt naphthenate (5% Co) | 0.2 |

Table 23

| Modifier | Loads | 20 ± 3°C. 24 hours | 60 ± 3°C. 24 hours |
|---|---|---|---|
| None | — | 4 mm | — |
| Example 12 | 0.4 % | No slump | No slump |

EXAMPLE 13

A fluid dispersion was prepared by mixing one part of an emulsifiable polyethylene wax having an average molecular weight of 2100, an acid number of 16, a softening point of 114°C., a density of 0.964 and a penetration of one; and two parts of N,N'-12-hydroxystearoylpropylenediamide (m.p. 125°C.) obtained from one mole of propylenediamine and two moles of hydrogenated castor oil fatty acid in 7 parts of xylol; and was then added in an amount of 0.6% to an amino alkyd point having a composition as given in Table 24, with a three roller mill. The same test as before was made and the test results are given in Table 25. A test for accelerated can stability was made at 40°C.

Table 24

| (Ingredients) | Amino alkyd resin paint (Amounts) |
|---|---|
| Rutile, titanium dioxide | 40 parts |
| Palm oil alkyd resin solution (60% nonvolatile, 32% oil length) | 33.4 |
| Soya alkyd solution (50% nonvolatile, 41% oil length | 8.2 |
| Butyrated melamine resin solution (Super Beckamine G-821 sold by Dainippon Ink & Chemicals, Inc) (50% nonvolatile) | 18.4 |

Table 25

| Modifier | Loads | antisag properties | Antisag properties after 30 days' storage at 40°C. | Pigment antisettling properties | Accelerated can stability |
|---|---|---|---|---|---|
| None | — | 10 mils | 10 mils | Poorest | Poorest |
| Example 13 | 0.6 % | 13 mils | 13 mils | Best | Best |

What we claim is:

1. A process for improving the rheological and suspension properties of a nonaqueous fluid system which contains finely divided solid particles characterized in that: (I) an amide wax having a melting point of about 100° to about 160°C. obtained from reaction of hydrogenated castor oil fatty acid or an organic acid mixture containing at least 30 molar percent of hydrogenated castor oil fatty acid with at least one primary or secondary amine; and (II) an emulsifiable polyethylene wax having an acid number of about 2 to 50, a softening point of about 95 to about 120°C., a density of about 0.92 to about 0.98 and a penetration of about 1 to about 20; are added to the nonaqueous fluid system.

2. The process of claim 1 further characterized in that the total added amount of the amide wax (I) and the emulsifiable polyethylene wax (II) is 0.1 to 5% based on the weight of the nonaqueous fluid system and the weight ratio of the amide wax (I) to the emulsifiable polyethylene wax (II) is 10:90 to 85:15.

3. A nonaqueous fluid system containing finely divided solid particles having improved rheological properties and suspension properties characterized in that: (I) an amide wax having a melting point of about 100° to about 160°C. obtained from reaction of hydrogenated castor oil fatty acid or an organic acid mixture containing at least 30 molar per cent of hydrogenated castor oil fatty acid with at least one primary or secondary amine and (II) an emulsifiable polyethylene wax having an acid number of about 2 to about 50, a softening point of about 95° to about 120°C., a density of about 0.92 to about 0.98 and a penetration of about 1 to about 20; are present in the system.

4. The system of claim 3 in which the total amount present of the amide wax (I) and the emulsifiable polyethylene wax (II) is 0.1 to 5% based on the weight of the system and the weight ratio of the amide wax (I) to the emulsifiable polyethylene wax (II) is from 10:90 to 85:15.

5. The process of claim 1, in which the emulsifiable polyethylene wax has a molecular weight of from 700 to 6,000.

6. The process of claim 5, in which the molecular weight is from 1,000 to 3,500.

7. The system of claim 3, in which the emulsifiable polyethylene wax has a molecular weight of from 700 to 6,000.

8. The system of claim 7, in which the molecular weight is from 1,000 to 3,500.

9. The process of claim 1 in which the amines are selected from at least one of the group consisting of: monoethanolamine; diethanolamine; aminoethyl ethanolamine; ethylenediame; propylenediamine; hexamethylenediamine; octamethylenediamine; dodecamethylenediamine; diethylenetriamine; triethylenetetramine; xylylenediamine; and benzylamine.

10. The system of claim 3 in which the amines are selected from at least one of the group consisting of: monoethanolamine; diethanolamine; aminoethyl ethanolamine; ethylenediamine; propylenediamine; hexamethylenediamine; octamethylenediamine; dodecamethylenediamine; diethylenetriamine; triethylenetetramine; xylylenediamine; and benzylamine.

* * * * *